(12) United States Patent
Difeo

(10) Patent No.: US 7,175,500 B1
(45) Date of Patent: Feb. 13, 2007

(54) YO-YO HAVING A CONCAVE BEARING SURFACE FOR PERFORMING STRING LAYERING MANEUVERS

(76) Inventor: Frank P. Difeo, 23 Offer St., Bradford, MA (US) 01835

( * ) Notice: Subject to any disclaimer, the term of this patent is extended or adjusted under 35 U.S.C. 154(b) by 113 days.

(21) Appl. No.: 10/766,495

(22) Filed: Jan. 28, 2004

Related U.S. Application Data

(60) Provisional application No. 60/485,630, filed on Jul. 10, 2003.

(51) Int. Cl.
*A63H 1/30* (2006.01)
(52) U.S. Cl. .................................................. 446/250
(58) Field of Classification Search ................. 446/250
See application file for complete search history.

(56) References Cited

U.S. PATENT DOCUMENTS

| | | | |
|---|---|---|---|
| 2,629,202 A | 2/1953 | Stivers | |
| 3,175,326 A | 3/1965 | Isaacson | |
| 3,953,936 A * | 5/1976 | Ennis | 446/250 |
| 4,442,625 A * | 4/1984 | MacCarthy | 446/250 |
| 6,089,945 A * | 7/2000 | Van Dan Elzen | 446/250 |
| 6,213,838 B1 * | 4/2001 | Amaral | 446/250 |
| 6,331,132 B1 * | 12/2001 | Watson | 446/250 |
| 6,494,761 B1 | 12/2002 | Amaral | |
| 6,599,165 B1 * | 7/2003 | Van Dan Elzen | 446/250 |

* cited by examiner

*Primary Examiner*—John A. Ricci
(74) *Attorney, Agent, or Firm*—Robert Nathans

(57) ABSTRACT

A yo-yo is disclosed with a substantially frictionless freely rotatable ball bearing, positioned upon a spindle between two separate halves of rotatable yo-yo members, such ball bearing having a smooth, continuous, outer concave surface. The smooth concave surface constitutes a segment of a circle having a radius of about 0.225 inches, contacting the yo-yo string, and is shallow, continuous and uninterrupted by the presence of a prior art groove formed in the outer surface. This surface configuration tends to urge the string towards the center of the bearing to reduce string friction against inside walls of the yo-yo halves while the string is winding around the bearing, yet allows some lateral movement of the string, enabling efficient performance of string layering maneuvers.

11 Claims, 2 Drawing Sheets

YO-YO HAVING A CONCAVE BEARING SURFACE FOR PERFORMING STRING LAYERING MANEUVERS

CROSS-REFERENCE TO RELATED APPLICATIONS

This application claims the benefit of a provisional application No. 60/485,630, filed Jul. 10, 2003 in the name of Frank DiFeo, entitled: "Yo-Yo Having a Concave Bearing Surface".

BACKGROUND OF THE INVENTION

The present invention relates to amusement devices and more particularly to yo-yos.

The historical background of the yo-yo is a topic for debate among many yo-yo enthusiasts. According to the American Yo-yo Association, it is commonly believed that the yoyo originated in China; however, the first historical mention of the yo-yo was from Greece in the year 500 B.C. Also, drawings of objects resembling the yo-yo have been discovered in ancient Egyptian temples. From these early beginnings, the yo-yo spread throughout the world before being introduced into the United States during the 1920s.

Although the popularity of the yo-yo has gone up and down since it was first introduced, the yo-yo is still popular and yo-yo enthusiasts are constantly pushing the limits of what maneuvers or "tricks" they can perform with the toy. The most rudimentary yo-yo maneuver is to drop the yo-yo from the user's hand in which one end is looped to the user's finger and the other end is looped around the axle between the two yo-yo halves. When the user drops the yoyo from his/her hand, the yo-yo unwinds down the string towards the ground. Upon reaching the end of the string, the user simultaneously pulls the other end of the string up, thereby causing the yo-yo to wind back up the string and into the user's hand once again.

One innovation was to tie the two ends of the string together to make a circle and then loop the string around the axle between the two yo-yo halves. The string-looping innovation enabled users to perform a more advanced maneuver. Instead of pulling the string up as the yoyo reaches the end of its tether, the user lowers his/her hand thereby causing the yo-yo to spin in the loop at the end of the string. The maneuver is commonly referred to as "putting the yo-yo to sleep." Other more advanced maneuvers involve placing additional layers or segments of string within the gap between the two yo-yo halves, which may result in friction between the string and the yo-yo halves.

Manufacturers have sought to design the yo-yo to facilitate the various maneuvers performed by yo-yo enthusiasts. For example, manufacturers have sought to increase spin times, thereby increasing the time allowed to perform such advanced maneuvers. One approach has been to increase the centripetal forces acting on the spinning yo-yo by redistributing the weight of the yo-yo halves to the periphery of the halves. Another approach has been to use a trans axle with bearings attached to the axle to avoid the friction between the axle and the string created when a user puts the yo-yo to sleep. Friction between the string and the yo-yo halves, however, remains an obstacle to greater spin times. Frequently, the string will move off the center of the bearing as the yo-yo winds up the string back to the user's hand. The string will then rub the inner surface of the yo-yo halves as it unwinds back down the string, thereby creating friction and thus slowing to spin of the yoyo. The friction created between the string and the inner surfaces of the yo-yo halves is especially a problem when a user performs more advanced "string layering" maneuvers. The additional layers of string tend to move from the center of the bearing and rub the inner surfaces of the yo-yo halves, thus creating friction and slowing the rate of spin of the yo-yo.

One attempt to solve problem of friction between the string and inner surfaces of the yo-yo halves includes adding a groove to the bearing. This feature was disclosed as early as 1965 by Isaacson U.S. Pat. No. 3,175,326. Although the groove might prevent the string from contacting the yo-yo halves, the groove does not allow substantial desired lateral movement of the string and thus limits the aforesaid desirable "string layering" maneuvers that can be performed.

Accordingly, there is a need for a yo-yo bearing arrangement that tends to urge the string towards the center of the bearing and away from the side of the spinning yo-yo halves, and yet beneficially allowing the string to move laterally.

BRIEF SUMMARY OF A PREFERRED EMBODIMENT OF THE INVENTION

The need set forth in the preceding paragraph is met in accordance with the present invention, whereby a yo-yo is provided with a bearing, preferably a ball bearing, having a shallow concave outer rim that tends to urge the string towards the center of the bearing while the string is winding around the bearing, yet allows some lateral movement of the string when performing "string layering" maneuvers.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS OF THE INVENTION

Figure 1:
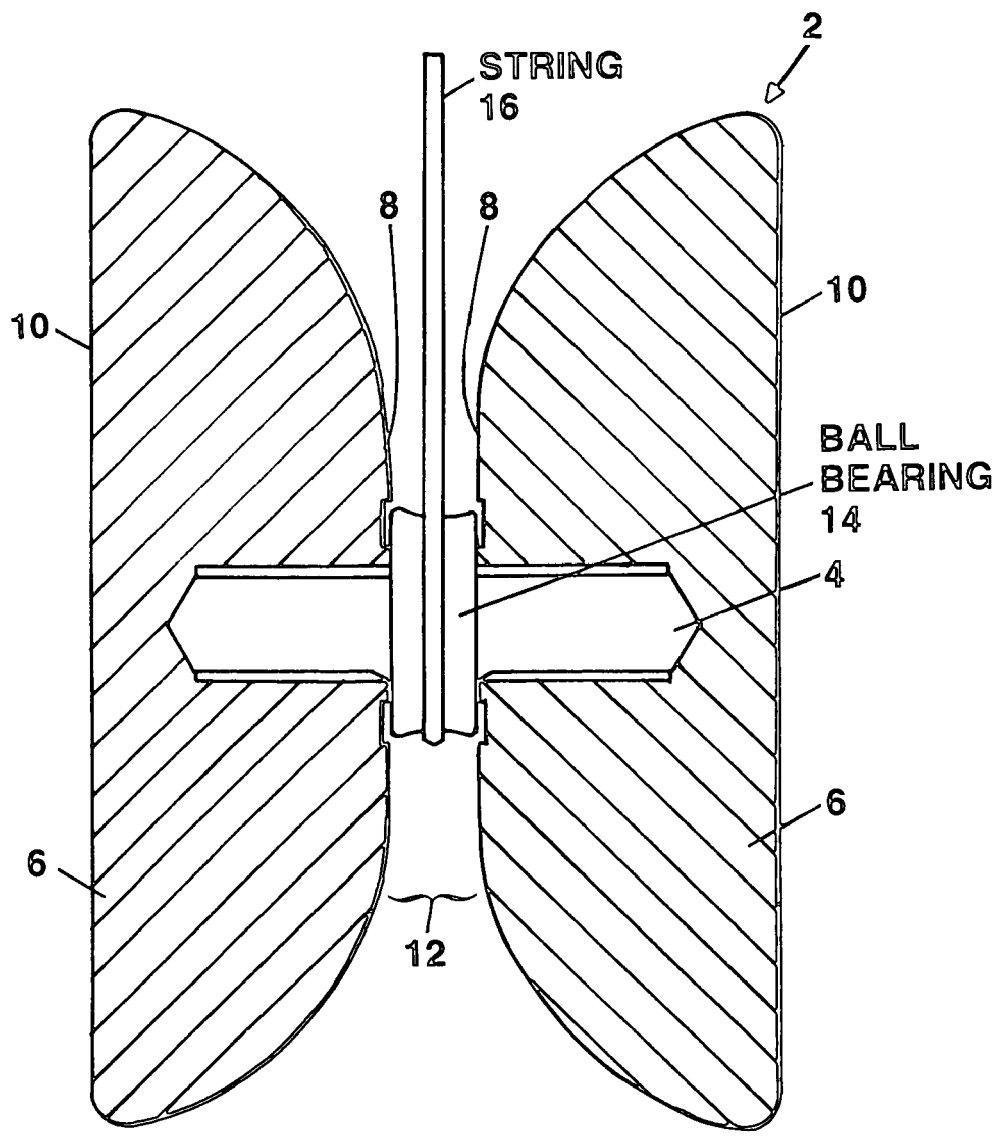
FIG. 1 is a partially cross-sectional view of a yo-yo in accordance with one embodiment of the present invention.

Referring to FIG. 1, one embodiment of a yo-yo 2, according to the present invention, includes an axle 4 affixed between conventional yo-yo halve members 6, each having an inner surface 8 and an outer surface 10. A gap 12 is defined by the space between the inner surfaces 8 of the yo-yo halve members 6. A bearing 14 is rotatably mounted upon an exposed portion of the axle 4 within the gap 12 such that the bearing 14 can spin freely around the axle 4. A string 16 includes one end looped around the bearing 14 and is wound around the bearing 14 between the gap 12. Although the exemplary embodiment shows a specific design, the yo-yo halve members 6, the axle 4 and the string 16 can be made according to any known yo-yo designs.

Figure 2:
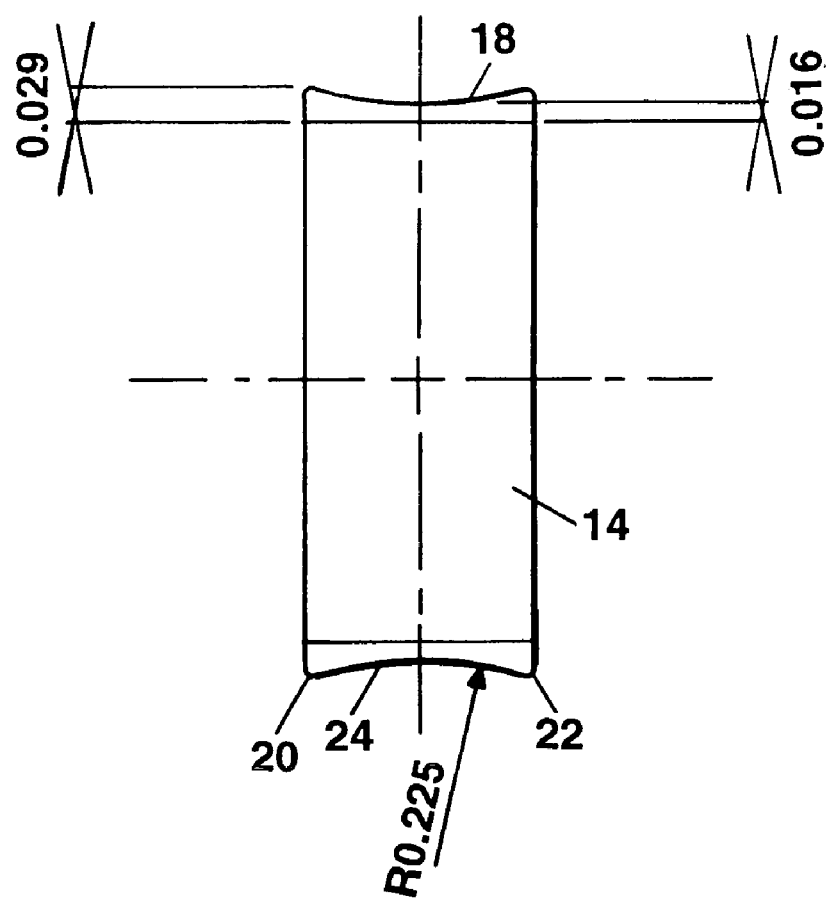
FIG. 2 is a side view of the bearing in the yo-yo shown in FIG. 1.

Referring to FIG. 2, the ball bearing 14 preferably includes an outer race surface 18 having a shallow concave outer surface around which the string 16 winds. Best performance is obtained when the concave outer surface is formed (e.g. by grinding) directly into the outer surface of a conventional ball bearing. In contrast with the grooved bearing disclosed by the foresaid patent to Isaacson, the outer race surface constitutes a smooth, continuous and thus groove-less, concave surface that readily permits the aforesaid lateral layering of string during the performance of the desired "string layering" maneuvers. The bearing 14 can be made by machining the concave shape in the outer race of a bearing made of steel or other suitable materials. In the exemplary preferred embodiment, the surface of the outer raceway 18 has a concave shape with a radius of about 0.225 in. Other designs and dimensions are also contemplated. In general, the shallow concave shape of the race 18 keeps the string 16 centered while the yo-yo 2 is spinning to avoid friction caused by interference of the string 16 with the inner surfaces 8, which slows the spin of the yo-yo 2 prematurely. In particular, while performing string layering maneuvers or tricks, the concave groove-less nature of the shallow race surface 18 tends to urge the layers of string 16 away from the inner surfaces 8 of the yo-yo halves 6, thereby reducing friction and beneficially increasing spin time. Although the string 16 shown in FIG. 1 is generally centered at portion 24, the concave shape of the outer race surface 18 also allows the string 16 to move laterally, i.e., from one edge 20 of the bearing 18 to the other edge 22 of the bearing 14 when needed. The ability to move the string 16 laterally allows the user to cause the string 16 to contact the inner surfaces 8, for example, to make the yo-yo 2 return to the user's hand.

Because other embodiments of the invention may occur to the worker in the art, the scope of the invention is to be restricted solely to the terms of the following claims and art recognized equivalents thereto. For example a bearing such as a roller bearing or freely rotatably lubricated sleeve or spool bearing of a polymeric material having good lubricity, surrounding the spindle, may be employed within the spirit of the invention; see U.S. Pat. No. 4,895,547 to Amaral. While the aforesaid concave surface is preferably ground right into the outer surface of a conventional bearing, it may be feasible to press-fit a ring or sleeve having the concave outer surface about a conventional bearing.

What is claimed is:

1. A yo-yo with a substantially frictionless rotary bearing, positioned upon a spindle between two separate halves of rotatable yo-yo members, said substantially frictionless bearing having a smooth continuous outer concave surface, uninterrupted by the presence of a groove formed in said outer surface, for supporting a yo-yo string that tends to urge the string towards the center of the rotary bearing while the string is winding around the bearing, yet allows some lateral movement of the string, enabling efficient performance of yo-yo string layering maneuvers and wherein said smooth continuous outer concave surface constitutes a curve of a circle having a radius of about 0.225 inches and wherein said smooth continuous outer concave surface contacting a yo-yo string is machined directly into a conventional ball bearing.

2. A yo-yo with a substantially frictionless rotary ball bearing, positioned between two separate halves of rotatable yo-yo members, said substantially frictionless bearing having a shallow concave curved outer surface, uninterrupted by the presence of a groove formed in said outer surface, for contacting a yo-yo string that tends to urge the string towards the center of said substantially frictionless bearing while the string is winding around the bearing, yet allows some lateral movement of the string, enabling efficient performance of yo-yo string layering maneuvers.

3. The yo-yo of claim 2 wherein said shallow concave outer surface constitutes a curve of a circle.

4. The yo-yo of claim 3 wherein said shallow concave outer surface constitutes a curve of a circle having a radius of about 0.225 inches.

5. The yo-yo of claim 3 wherein said shallow concave outer surface contacting a yo-yo string is machined directly into a conventional ball bearing.

6. The yo-yo of claim 2 wherein said shallow concave outer surface contacting a yo-yo string is machined directly into a conventional ball bearing.

7. The yo-yo with a substantially frictionless rotary ball bearing, positioned upon a spindle between two separate halves of rotatable yo-yo members, said substantially frictionless ball bearing having a smooth continuous curved outer concave surface, uninterrupted by the presence of a groove formed in said outer surface, for supporting a yo-yo string that tends to urge the string towards the center of the bearing while the string is winding around the bearing, yet allows some lateral movement of the string, enabling efficient performance of yo-yo string layering maneuvers.

8. The yo-yo of claim 7 wherein said smooth continuous outer concave surface constitutes a curve of a circle.

9. The yo-yo of claim 8 wherein said curve of a circle has a radius of about 0.225 inches.

10. The yo-yo of claim 7 wherein said smooth continuous outer concave surface is machined directly into a conventional ball bearing.

11. A method of enhancing efficient performance of yo-yo string layering maneuvers comprising supplying a yo-yo manufacturer with a substantially frictionless rotary ball bearing, configured to surround a spindle positioned between two separate halves of rotatable yo-yo members, said substantially frictionless ball bearing having a shallow curved concave outer surface, uninterrupted by the presence of a groove formed in said outer surface, for contacting a yo-yo string that tends to urge the string towards the center of said substantially frictionless ball bearing while the string is winding around the bearing, yet allows some lateral movement of the string.

* * * * *